3,846,225
HIGH TEMPERATURE INSULATION-BINDER COMPOSITIONS

Joseph P. Stalego, Newark, Ohio, assignor to Owens-Corning Fiberglas Corporation
No Drawing. Continuation of abandoned application Ser. No. 431,196, Feb. 8, 1965. This application Aug. 28, 1970, Ser. No. 68,017
Int. Cl. D02g 3/00
U.S. Cl. 161—175                    6 Claims

ABSTRACT OF THE DISCLOSURE

Glass fiber insulating materials wherein the glass fibers are bonded together at points of fiber-to-fiber contact with a non-punking organic binder material and the resultant bonded mass is saturated with an inorganic binder-saturant which upon subsequent treatment hardens to form a ceramic-like heat-resistant coating for the glass fibers and also serves an auxiliary bonding function.

The inorganic-binder saturant contains, as the essential ingredients, boric acid and bentonite, with the bentonite being in the hydrogen form. Also disclosed is a method of making the glass fiber insulating materials.

---

This application is a continuation of application Ser. No. 431,196, filed Feb. 8, 1965, now abandoned.

This invention relates to novel high temperature resistant siliceous insulating compositions and to their manufacture. In particular, the invention is directed to bonded glass fiber insulating materials ranging from resilient, wool-like masses, having a density as low as 1 to 3 pounds per cubic foot, to relatively dense, molded board-like structures of substantially permanent shape, having a density as high as 40 to 50 pounds per cubic foot. More particularly, the invention concerns glass fiber insulating materials wherein the glass fibers are bonded together at points of fiber-to-fiber contact with a non-punking organic binder material and the resultant bonded mass is saturated with an inorganic binder-saturant which, upon subsequent treatment, hardens to form a ceramic-like, heat-resistant coating for the glass fibers and also serves an auxiliary bonding function.

The production of glass and other vitreous fibers for use as thermal insulating materials, acoustical insulating materials, filter media and textile processing is well known. Regardless of use, vitreous fiber articles, in most instances, are associated with, or at least partially coated with, a resinous synthetic material. In particular, thermal and acoustical insulating materials of the type described usually comprise a mass of intermeshed vitreous fibers wherein the fibers are at least partially coated with a hardened infusible phenolic material which bonds the individual glass fibers in the mass to one another at points of contact.

Various materials, principally those based upon synthetic resin systems such as, for example, the phenolic resoles, have been used in the past and are presently in use as binder systems for glass fiber insulation. Due, however, to the primarily organic nature of the binders many of the inherent advantages of the glass fibers, such as high temperature stability, are lost. For example, glass fibers can be used at temperatures up to the fusion temperature of the glass, e.g., at temperatures of 1200° F.–1500° F., without deterioration. On the other hand, organic binder systems of the type described are subject to thermal deterioration at temperatures as low as 300° F. Consequently, glass fiber insulation products making use of such organic resinous binder systems are limited in practical usage to environments wherein temperatures do not exceed 300° F.–325° F. for extended periods of time or 400° F.–425° F. for short times. Use of a product formed from glass fibers and an organic binder system, beyond the above-described temperature and time conditions, will lead to deterioration of the binder, the attendant danger of punking of the resin, especially at temperatures in excess of 425° F., and subsequent separation of the glass fibers at their points of contact.

Punking is a term of art used to denote the comparatively rapid, flameless oxidations of the binder with generation of heat. Odors and fumes given off by such thermal decomposition are offensive and are capable of discoloring and staining adjacent materials.

Various methods have heretofore been attempted in order to increase the punk resistance of the binder systems and to more nearly align the properties of the binder system used with the properties of the glass fiber. For example, reaction of nitrogenous substances such as melamine, dicyandiamide, urea, thiourea, biurea, guanidine and similar compounds with phenol-aldehyde partial condensation products of the resole type has been suggested to provide a binder resin of increased punk resistance. Although the incorporation of such nitrogenous compounds improves the punk resistance and overall thermal stability of the binder system, products composed of glass fibers in association with such binder systems are still not suitable for use in environment approaching the limits of the heat stability of the glass fiber itself. Other methods intended to overcome the compartively low thermal stability of phenolic resole binder systems include the admixture thereof with other resinous systems, such as alkyds, or the use of water glass or sodium silicate as the binder system. The latter method is, however, disadvantageous in that the high sodium ion concentration in commercially available sodium silicates leads to attack of the glass fiber by the sodium ion and subsequent deterioration of the fibers, with the result that the products formed are weak and subject to many of the limitations present in the use of cementitious materials from the standpoint of strength, flexibility and brittleness. Moreover, most past attempts to produce inorganic binder systems have been unsuccessful in providing a system which is strongly adherent to the glass fiber. Obviously, an inorganic binder system which would improve the thermal stability of the ultimate product is inadequate if, because of poor adhesion, the binder cracks and sloughs from the glass fiber under conditions of use. Consequently, an inorganic binder system which would allow the use of fabricated glass fiber materials at the upper limits of the temperature stability of of the glass fiber, and which is strongly adherent, has been much sought by the art.

It is an object of the instant invention to provide an inorganic binder composition which has high thermal stability, which does not attack the glass fiber and which forms a strong, adherent bond with the glass fiber.

Another object of this invention is to provide a method for bonding glass fibers together which utilizes a combination of an organic binder and an inorganic binder-saturant, the inorganic binder-saturant being applied in such a maner and to such an extent that a ceramic sheath is formed around the fiber, which is strongly adherent, and which acts as a protective coating for the glass fiber and also acts to insure bonding of the glass fibers to one another, at points of contact, at temperatures at which the organic binder is rendered non-functional.

A further object is the provision of a highly heat-resistant siliceous fiber insulating material wherein the individual fibers are coated and bonded to one another by organic and inorganic binding agents.

According to the invention, it has now been unexpectedly discovered that the temperature resistance, and therefore the usefulness of siliceous fiber and fabric materials bonded with organic binder compositions may be extended and upgraded by saturating the bonded material with an inorganic binder-saturant, hereinafter described. Upon heating, the inorganic binder-saturant forms a high temperature-resistant coating which will preserve the structural integrity of the product even at temperatures above the fusion temperature of the glass fiber itself.

The novel inorganic binder-saturant to which the invention is primarily directed comprises, as essential ingredients, bentonite and boric acid in an amount sufficient to convert the bentonite to the hydrogen form, and producing, upon heating, a reactive complex which is strong and heat resistant. Preferably, the binder saturant also contains a reactive kaolin, in which case the amount of boric acid is sufficient to convert at least one of the two other ingredients, i.e., bentonite and kaolin, to the hydrogen form.

THE BASE MATERIAL

The siliceous compositions which are used as the structural material for bonded glass fabrics, insulation products, pipe wrapping, fire stock, blocks, tiles and similar articles, are known in the art as "glass fibers" and such term is intended to encompass any fiber made from those materials defined in the ordinary usage of the art as glasses. Such term is further intended to include glass fibers of the type produced by methods known in the art, such as by the attenuation of molten streams of glass by blasts of high pressure steam or air directed angularly downward into the streams as they issue from a bushing of a glass melting tank, as described in Slayter et al. Pat. No. 2,206,058 or in Simison et al. Pat. No. 2,189,840. In addition, the superfine glass wool fibers recently developed and formed by burner blast blown systems may be utilized. Further, glass fibers capable of use in the practice of this invention may be prepared of continuous glass fibers which are cut or chopped to predetermined lengths or of glass fiber or yarns of endless length which are deposited in swirl patterns and the like and in which such continuous fibers may be used alone or in combination with wool or staple type fibers in the formation of bats, mats and boards for use with binders in the manufacture of insulation products.

The articles described above have, in general, fallen into one of several categories, depending on the method employed in their production. One such method involves the drawing of streams of molten glass through small orifices in the bottom of a glass melting tank, the rapid acceleration of the streams to cause attenuation thereof into fibers of a desired diameter, projection of the fibers onto a foraminous conveyor, association of a suitable binder composition with the fibers as they are being projected toward the conveyor, and curing of the binder while associated with the ultimate product. Such method is known as the "glass fiber board process." A second general method for producing such boards is known as the "wet method" wherein fibers and a suitable binder are formed into a slurry with water and the fibers with associated binder are deposited on a continuously advancing screen. Water and some of the binder flow through the screen which subsequently carries the deposited fibers and binder through a drying oven. A third such method is similar to the first except that the binder is not associated with the fibers as they are projected onto the conveyor. Instead, an unbonded mat is collected, and is subsequently impregnated with a binder which is then suitably cured.

In general, the glass fibers in commercial usage and which are particularly contemplated herein, have a composition approximately within the following ranges: from about 50 percent [1] to about 75 percent silica, up to about 15 percent boric oxide, from about 2 percent to about 25 percent alkaline earth metal oxides such as, for example, CaO, MgO, BaO and SrO, with the amount of CaO normally being at least 50 percent of the alkaline earth metal oxide content, from about 0 percent to about 15 percent of alkali metal oxides, particularly $Na_2O$, $K_2O$ or both, up to about 10 percent titania, up to 1 percent iron oxide and from about 0 percent to about 3 percent of fluorine. Traces of other glass-forming ingredients and/or impurities such as MnO, $ZrO_2$ and ZnO may also be present.

The fibers, of which the herein above described articles may be fabricated, may have a diameter ranging, depending on the ultimate use thereof, from a minimum 10 HT [2] to about 70 HT although the preferable diameter will fall between about 35 HT and 65 HT.

THE ORGANIC BINDER

The resinous materials which are used as the main constituent of the organic binder of the present invention are the phenolic resins and particularly such resins of the type known as resoles. As is well known in the art, a resole is formed by the partial condensation of a phenol with an excess of an aldehyde in alkaline solution. The phenolic resoles are known in the art and a detailed discussion of resoles can be found in *The Chemistry of Phenolic Resins,* Robert W. Martin, John Wiley & Sons, Inc., New York, N.Y. 1956. In general, the resoles may consist of phenol-aldehyde condensation products which may be used alone or in admixture with other hardenable resin systems. The specific heat-hardenable phenolic resins, used in the preparation of articles according to the invention, are not, however, part of the invention per se and their identity is therefore of only incidental importance. As stated above, the heat-hardenable phenolics used herein are widely available through commercial sources. In most instances, the phenol-aldehyde type of phenolic is prepared by the condensation of phenol and formaldehyde, although any phenol and any aldehyde which will condense to form a heat hardenable resole-type partial condensation product is suitable. Thus in lieu of formaldehyde, there may be substituted para-formaldehyde, furfural, acetaldehyde, metaldehyde, tetraldehyde and the like. In place of phenol (i.e. monohydroxy benzene) there may be used equivalent compounds such as resorcinol, xylenols, the cresols and similar compounds. In addition, where the preparation of a phenol-amino compound-aldehyde condensation product is indicated, the resole may be condensed with such amino compounds as melamine, urea, thiourea, dicyandiamide, biurea, guanidine and similar materials. Of the various amino compounds set forth, dicyandiamide, urea, biurea and thiourea are preferred, since a binder composition containing same is not subject to the dilutability problems commonly associated with prior art binder compositions.

In a hardened state, a binder composition containing dicyandiamide exhibits little or no odor and imparts substantially improved durability and punk resistance to wool- and board-like products. Apparently, upon curing of the binder composition, the dicyandiamide functions as a crosslinking agent by reacting with methylol groups, without forming ether linkages, and thus increases the thermal resistance of the binder composition.

In lieu of the phenol-aldehyde and phenol-amino compound-aldehyde partial condensation products described above, the resin component of the organic binder composition may be prepared by the condensation of amino compounds such as those set forth above, either singly or in combination, with aldehydes such as formaldehyde, acetaldehyde and the like. As condensation catalysts, any of the reagents in conventional usage, such as the alkali metal hydroxides and the alkali metal carbonates, may be utilized. In addition inorganic acid catalysts such as boric acid, ammonium, sulfate and ammonium chloride and organc acid catalysts such as maleic, fumaric and phthalic acids and their ammonium salts are useful.

---
[1] The terms "percent" and "parts" are used herein and in the appended claims to refer to percent and parts by weight, unless otherwise indicated.

[2] Hundred thousandths of an inch.

In addition to the heat-hardenable resin component, the organic binder may contain other materials which, in toto, make up the formulation of the organic binder system. For example, the aqueous binder slurry may contain conventional processing aids such as emulsifiers, anti-foaming agents, plasticizers, dyes, flow control agents, fillers, extenders and the like.

A typical organic binder can be prepared as set forth in the following Example. Of course, binders similar or equivalent to those set forth above may be substituted for the specific binder described and are intended to fall within the scope of the invention. Similarly, the proportions of the reactants may be changed by one skilled in the art according to the particular formulation and end use desired.

THE INORGANIC SATURANT

As is indicated above, the present invention is based upon the discovery that bonded glass fiber products such as those discussed above can be significantly improved by saturation with an inorganic binder composition comprising boric acid and bentonite in a hydrogen form. Preferably the composition comprises boric acid, bentonite and at least one of the bentonite and kaolin is in a particularly reactive form. Such a composition is ideally suited as a high temperature binder which, in addition to its bonding function, forms, upon heating, a ceramic sheath around the bonded glass fiber thus enabling the glass fiber product, such as an insulating material, to be effective at much higher temperatures than prior products which have used only an inorganic binder. In addition, it has been found that the development and maintenance of a satisfactory bonding relationship between the inorganic binder and the glass fiber depends on the ability of the binder material to react with the surface of the glass fiber and that such reaction should not be of such a nature as to change the characteristics of the glass fiber or cause deterioration in its flexibility and strength characteristics. It is known that certain materials, such as sodium silicate and cementitious materials containing the Na+ ion, attack the glass fiber, thereby decreasing fiber strength and flexibility. When an inorganic binder is prepared, however, wherein boric acid is used in conjunction with bentonite, there results a boric acid-bentonite system which acts like and is considered to be a de-sodiumized bentonite in the hydrogen from and a highly reactive and glass-forming sodium borate in the hydrogen form. Additionally the inorganic binder-saturant of the invention may include a hydrogen-active kaolin clay.

The boric acid in the inorganic saturant slurry neutralizes sodium ions present in the bentonite prior to application of the slurry to the insulating structure. Moreover, the boric acid apparently neutralizes and removes alkali ions from the surface of the glass fibers, thereby creating additional reactive hydroxyl groups on the surface of the fibers. When the saturated insulation structure is dried, the consequential dehydration of the saturant apparently causes polymerization or other reaction of the boric acid and sodium borate in the system with the clay and other ingredients.

When such a composition is used to saturate a bonded glass fiber material, there occurs an exchange of H+ from the kaolin and de-sodiumized bentonite for Na+ on the surface of the glass fiber, thus leaving the surface of the fiber in the reactive hydrogen form. Upon heating, the de-sodiumized bentonite, kaolin clay, boric acid (which is at least partially reacted with the various alkali ions in the system) and other ions extracted from the glass surface react with the hydrogen-active glass fiber surface to form a complex which is very strong and heat resistant.

A suitable saturant binder can be prepared from boric acid, bentonite and a Kaolin A, hereinafter identified in Table I by chemical analysis in percent and particle size distribution. Various other clays, also similarly identified in Table I, may be substituted for the Kaolin A in the saturant-binder. Kaolin clays other than those specifically identified hereinafter may be used, providing that such clays are reactive with the binder—glass fiber complex upon dehydration.

TABLE I

|  | Bentonite | | Kaolin | | |
| --- | --- | --- | --- | --- | --- |
|  | A | B | A | B | C |
| Silica | 63.07 | 48.90 | 45.92 | 45.21 | 47.02 |
| Alumina | 21.08 | 16.60 | 37.02 | 37.75 | 37.87 |
| Iron | 3.60 | 1.00 | 1.16 | 1.01 | 0.80 |
| Titania | 0.14 | 1.20 | 1.05 | 1.97 | 0.21 |
| Lime | 0.65 | 6.13 | 0.32 | 0.08 | 0.08 |
| Magnesia | 2.67 | 2.17 | 0.26 | 0.12 | 0.16 |
| Soda | 2.20 | 0.30 | 0.29 | 0.19 | 0.24 |
| Potash | 0.37 | 0.20 | 0.22 | 0.18 | 0.20 |
| Ignition |  | 23.50 | 13.75 | 13.65 | 13.49 |

| Particle size distribution | Bentonite | Kaolin | | |
| --- | --- | --- | --- | --- |
|  |  | A | B | C |
| Percent: |  |  |  |  |
| 10 microns | 85.0 | 89.5 | 97.2 | 83.5 |
| 5 microns | 79.0 | 82.0 | 94.0 | 77.0 |
| 2 microns | 70.0 | 69.0 | 86.0 | 68.5 |
| 1 micron | 61.0 | 57.0 | 75.8 | 59.0 |
| 0.5 micron | 50.0 | 43.0 | 62.0 | 48.0 |
| 0.2 micron | 26.0 | 21.0 | 33.0 | 24.0 |

The bentonite, in combination with boric acid, provides film-forming and bonding characteristics to the binder-saturant while the kaolin clay acts as a reactive filler-extender which builds up the density of the base material.

In addition to the boric acid, bentonite and kaolin clay, the binder-saturant may contain other materials necessary to provide the proper processing characteristics to the glass fiber composition. For example, dispersing agents, such as sodium hexametaphosphate and other polyphosphates and similar materials, are incorporated to disperse the bentonite and kaolin. Additionally, phosphoric acid may be added to control the pH of the slurry at about 6.3 to 6.7 and thus aid in dispersing the clays and in controlling the viscosity of the slurry. Other processing materials such as, for example, wetting agents, particularly sulfonated dicarboxylic acid esters and anti-foam agents particularly silicones such as the methylpolysiloxane anti-foam agents may be incorporated into the saturant. The silicone anti-foam agent can be dissolved in a small amount of Stoddard or of another solvent.

Additionally, the saturant may also contain inert fillers such as pyrophyllite, pigments, dyes, plasticizers and other conventional additives. A typical inorganic binder-saturant can be prepared and used as set forth in the following Example.

EXAMPLE

A 600 gallon mixing tank equipped with a Cowles agitator [3] was charged, with slow agitation, with 400 gallons of water, 2.5 pounds of sodium hexametaphosphate, 50 pounds of boric acid and 220 cc. of an 85 percent aqueous solution of phosphoric acid. After these ingredients were fully mixed and dissolved, a 250 pound portion of bentonite was added to the solution. The sides of the tank were then washed down and the slurry was agitated at high speed for at least 15 minutes. When the slurry appeared to be well mixed, additions of 750 pounds of kaolin clay and 250 pounds of pyrophyllite were made and the slurry was agitated at high speed for 20 minutes, at which time agitation was stopped and a sufficient quantity of water was added to produce 575 gallons of saturant-binder slurry having a solids content of about 22.7 percent. When the additional water had been added, the agitator was again started at slow speed and a 5 quart quantity of Stoddard solvent containing 4 ounces of a methylpolysiloxane anti-foam agent and 14 quarts of a 75 percent aqueous solution of sulfonated dicarboxylic acid ester wetting agent were added. Agitation was then

---

[3] See U.S. Patent 2,651,582, FIGS. 10–12.

continued for 15 minutes and the slurry was pumped into a circulating tank.

The slurry of inorganic binder-saturant prepared as described above was then used to saturate bonded 2" x 24" x 48" Intermediate Fiber Basic Board, prepared as described below, to a 10.75 pcf nominal density. The boards were saturated with variations of the slurry just described, dried at 400° F. for 6 hours and tested for ignition loss, thermal stability, bond strength and compressive strength. The saturant-binder variations are given in Table II and the test results of boards saturated with the various saturant-binders are given in Table III.

Depending on the character of the fibrous structure and the density desired in the mass, the amount of solids remaining on the glass fibers can be varied from about 30 percent to about 200 percent, based upon the total weight of the glass fibers in the final product. Preferably, the solids should be from about 60 percent to about 100 percent, on the indicated basis.

Further, the binder-saturant is not limited in application only as a separate, subsequent step to the application of the organic binder, since in some instances, it may be preferable to add a mixture of the organic binder and the inorganic saturant binder in one step.

The Intermediate Fiber Basic Boards which were impregnated according to the invention, as described above, were produced using a binder which included a phenolic resole prepared according to the following procedure:

A suitable reactor was charged with 50 parts of phenol, 90 parts of a formalin solution containing a 45 percent concentration of formaldehyde and 3 parts of barium hydrate. The starting materials were mixed and heated while being constantly stirred by a propeller-type agitator. The charge was initially heated to 110° F. and maintained at that temperature for 3 hours. The reaction temperature was then raised to 140° F. and maintained at that level for an additional 4 hours and thereafter again raised to and maintained at 160° F. for about 1 hour. The reaction mixture was then cooled to 100° F. and neutralized, with dilute sulfuric acid, to a pH of about 7.2. This final product was then diluted with water to 65 percent solids.

A binder was then prepared by mixing the phenolic resole prepared as described in the preceding paragraph with the following materials in the order listed below:

| Ingredient | Amount of—Gallons | Amount of—Pounds | Pounds solids |
|---|---|---|---|
| Water | 894 | | |
| Gamma-aminopropyl triethoxysilane | | 1.7 | 1.7 |
| Ammonium sulfate | | 7 | 7.0 |
| Dicyandiamide | | 240 | 240.0 |
| Ammonia | 4 | | |
| Phenolic resole | 88 | | 440.0 |
| A mineral oil emulsified with stearic acid | 2.5 | | 10.0 |

The binder was prepared in a mixing tank provided with a propeller-type agitator and at a temperature of about 120° F. The final formulation had a solids content of about 8 percent. The weight ratio of monomeric dicyandiamide to phenolic resole was about 35:65.

TABLE II

| Sample | Kaolin | Bentonite | Boric acid | Pyrophyllite |
|---|---|---|---|---|
| 1 | 200 | 50 | 10 | |
| 2 | 150 | 50 | 10 | 50 |
| 3 | 200 | 50 | 20 | |
| 4 | 200 | 50 | 15 | |
| 5 | 200 | 50 | 15 | |
| 6 | 150 | | 15 | |
| 7 | | 50 | 10 | 200 |
| 8 | 200 | 50 | 20 | |

TABLE III

| Property | 1 | 2 | 3 | 4 | 5 | 6 | 7 | 8 | 9 |
|---|---|---|---|---|---|---|---|---|---|
| Density, p.c.f. | 10.92 | 11.05 | 10.84 | 11.02 | 10.94 | 11.12 | 10.82 | 10.92 | 10.71 |
| Ignition loss, percent | 9.03 | 8.73 | 10.02 | 9.14 | 10.17 | 10.69 | 6.35 | 10.41 | 8.2 |
| Dust in grams, 6" x 18" | 0.308 | 0.229 | 0.312 | 0.281 | 0.374 | 0.487 | 0.224 | 0.397 | 0.29 |
| Thermal stability: | | | | | | | | | |
| 24 hours at 1,000° F.: | | | | | | | | | |
| Percent weight loss | 9.02 | 9.49 | 10.26 | 9.20 | 9.83 | 10.65 | 6.02 | 10.09 | 9.42 |
| Percent length loss | 1.36 | 1.41 | 1.54 | 1.43 | 1.50 | 1.97 | 1.27 | 1.42 | 1.25 |
| 24 hours at 1,200° F.: | | | | | | | | | |
| Percent weight loss | 9.52 | 9.87 | 10.99 | 9.66 | 10.10 | 11.04 | 6.47 | 10.50 | 8.95 |
| Percent length loss | 1.35 | 1.56 | 2.01 | 1.45 | 2.08 | 4.13 | 4.52 | 1.79 | 1.08 |
| Hot plate—Exposure 4" thick: | | | | | | | | | |
| 4 hours at 1,000° F.: | | | | | | | | | |
| Percent weight loss: | | | | | | | | | |
| Top board | 0.92 | 1.07 | 1.42 | 0.20 | 1.04 | (1) | 0.78 | 1.49 | 0.56 |
| Bottom board | 3.93 | 4.35 | 4.49 | 3.67 | 4.37 | (1) | 3.02 | 4.68 | 3.44 |
| Inches warp: | | | | | | | | | |
| Top board | 0.18 | 0.27 | 0.32 | 0.18 | 0.21 | (1) | 0.18 | 0.25 | 0.18 |
| Bottom board | 0.24 | 0.24 | 0.30 | 0.33 | 0.30 | (1) | 0.16 | 0.25 | 0.18 |
| Interface temperature, ° F.: | | | | | | | | | |
| Peak | 730 | 760 | 750 | 730 | 730 | (1) | 725 | 720 | 755 |
| Mean | 700 | 730 | 700 | 705 | 730 | (1) | 705 | 690 | 735 |
| Surface temperature, ° F. | 100 | 155 | 160 | 180 | 160 | (1) | 180 | 165 | 90 |
| 4 hours at 1,200° F.: | | | | | | | | | |
| Percent weight loss: | | | | | | | | | |
| Top board | 1.83 | 1.68 | 1.75 | 1.32 | | | 1.41 | 1.79 | 1.73 |
| Bottom board | 6.79 | 6.36 | 6.98 | 5.93 | | | 4.52 | 6.65 | 6.07 |
| Inches warp: | | | | | | | | | |
| Top board | 0.54 | 0.56 | 0.57 | 0.47 | | | 0.70 | 0.55 | 0.52 |
| Bottom board | 0.18 | 0.11 | 0.09 | 0.23 | | | 0.11 | 0.21 | 0.20 |
| Interface temperature ° F.: | | | | | | | | | |
| Peak | 905 | 910 | 870 | 870 | | | 950 | 860 | 900 |
| Mean | 865 | 840 | 860 | 860 | | | 890 | 850 | 875 |
| Surface temperature | 190 | 215 | 200 | 200 | | | 200 | 180 | 130 |
| Bond strength, as received: | | | | | | | | | |
| Load in lbs./sq. ft. | 215.8 | 160.6 | 182.6 | 267.9 | 213.4 | 138.1 | 160.2 | 209.3 | 224 |
| Test density, p.c.f. | 10.86 | 10.26 | 10.89 | 11.25 | 11.71 | 11.40 | 11.06 | 11.11 | 11.0 |
| After 4 hours at 1,000° F.: | | | | | | | | | |
| Load in lbs./sq. ft. | 63.0 | 70.7 | 121.1 | 120.6 | 38.3 | | 92.6 | 118.2 | |
| Test density, p.c.f. | 10.38 | 10.20 | 10.18 | 10.43 | 10.10 | | 10.94 | 10.57 | |
| After 4 hours at 1,200° F.: | | | | | | | | | |
| Load in lbs./sq./ft. | 100.2 | 68.0 | 112.6 | 76.3 | | 16.5 | 16.5 | 82.5 | |
| Test density, p.c.f. | 9.67 | 10.13 | 9.36 | 10.27 | | | 9.96 | 10.05 | |
| Compressive strength, lbs./sq./ft. at 10% def.: | | | | | | | | | |
| As received | 1,754 | 1,500 | 1,492 | 1,740 | 1,527 | 824 | 1,137 | 1,265 | 1,183 |
| Test density, p.c.f. | 11.37 | 11.36 | 11.28 | 11.22 | 11.25 | 10.86 | 11.02 | 10.49 | 10.64 |
| After 4 hours at 1,000° F | 1,044 | 908 | 1,170 | 1,183 | 723 | | 825 | 1,211 | 738 |
| Test density, p.c.f. | 10.58 | 9.96 | 10.11 | 10.56 | 10.16 | | 10.83 | 10.45 | 9.42 |
| After 4 hours at 1,200° F | 982 | 903 | 1,113 | 1,365 | | | 443 | 1,025 | 841 |
| Test density, p.c.f. | 9.74 | 9.82 | 9.71 | 10.84 | | | 8.65 | 9.57 | 10.04 |

[1] Insufficient material to test.

The binder composition produced as just described was sprayed into a forming hood through which glass fibers were being projected onto a foraminous conveyor. The fibers were collected in the form of a randomly intermeshed wool-like mass associated with the binder composition. The relative proportion of associated binder was such that the binder, after cure, constituted slightly in excess of 5 percent of the total wool-like mass. Cure was accomplished in an oven maintained at a temperature of about 450° F. in which the glass fiber and associated binder were exposed for about 5 minutes by passage therethrough and within which the mass was compressed sufficiently that boards having apparent densities of about 5¼ to 6¼ pounds per cubic foot were produced.

When, for purposes of comparison, but not according to the invention, the Intermediate Fiber Basic Board (40–42 HT fibers) with a 5.5 percent nominal ignition loss, was exposed, in the oven, to a temperature of 1200° F., the binder composition which locks the fibers together in their randomly intermeshed arrangement was, within 1 hour, burned away. Presently available commercial insulating boards containing a resole binder, but without an amino compound such as dicyandiamide, are even less heat resistant.

It is understood, of course, that further variations in the amount of ingredients composing the saturant-binder are contemplated and are intended to be included within the scope of this invention.

For example, the weight percent of kaolin in the binder-saturant may be from 0 percent to 90 percent, and preferably from 50 percent to 80 percent. The weight percent bentonite may be from 10 percent to 90 percent and preferably from 15 percent to 45 percent. The weight percent boric acid may be from 2 percent to 45 percent and preferably from 3 percent to 15 percent. The weight percent pyrophyllite may range up to 50 percent and preferably is from 20 percent to 35 percent.

Further, the ratio of inorganic saturant binder to organic binder is variable, depending on the particular organic binder, process conditions and the properties desired in the end product. Generally, however, a ratio of 2 to 40 of inorganic to 1 of organic, based on dry weight is desirable, with the preferred ratio being about 15 to 30 if inorganic to 1 of organic.

Moreover, the binder-saturant may vary in solids content, ranging from a high of 40 percent to a low of 5 percent, and having a viscosity from as low as 5 cps. to as high as 100 cps.

Although the curing times and temperatures for the binder-saturant may vary within rather wide limits, such as from 420 minutes to 720 minutes and from 425° F. to about 550° F., the preferred range for most purposes is from about 480 to 600 minutes and from about 425° F. to about 475° F.

Obviously, many modifications and variations of the present invention are possible in the light of the above teachings. For example, the saturant can be used with basic boards made with other binder systems, as discussed above, or with binder systems similar to that specifically identified above where urea or other aminoplasts are used in an unreacted form in place of the dicyandiamide. It is, therefore, to be understood that, within the scope of the appended claims, the invention may be practiced otherwise than as specifically described.

What I claim is:

1. An article of manufacture comprising intermeshed glass fibers which have been initially bonded together with an organic binder selected from the group consisting of phenol-aldehyde, phenol-amino-aldehyde, and amino-aldehyde resins and subsequently saturated and bonded with from 30 percent to 200 percent, based upon the weight of the glass fibers, of an inorganic binder-saturant consisting essentially of boric acid and bentonite, said bentonite being in the hydrogen form.

2. The article of manufacture of claim 1 wherein said inorganic binder consists essentially of the reaction product of boric acid, bentonite and kaolin clay, at least one of said bentonite and kaolin being in hydrogen form.

3. An article of manufacture comprising glass fibers bonded with an organic binder selected from the group consisting of phenol-aldehyde, phenol-amino-aldehyde, and amino-aldehyde resins and having a coating thereon resulting from the reaction of the constituents of the glass fiber and a composition consisting essentially of boric acid and bentonite, said coating constituting from 30 percent to 200 percent, based upon the weight of the glass fibers.

4. The article of manufacture of claim 3 wherein said coating results from the reaction of the constituents of the glass fiber and a composition consisting essentially of boric acid, bentonite and kaolin.

5. The method of increasing the thermal resistance of a mass of glass fibers bonded together with an organic binder selected from the group consisting of phenol-aldehyde, phenol-amino-aldehyde, and amino-aldehyde resins which comprises saturating the glass fiber organic binder mass with from 30 percent to 200 percent, based upon the weight of the glass fibers, of an inorganic binder-saturant consisting essentially of boric acid and bentonite, said bentonite being in the hydrogen form, and heating the saturated mass to form a coating on the glass fiber surfaces by reaction between the constituents of the fibers and the inorganic binder-saturant.

6. The method of fabricating a high temperature insulation product comprising the steps of depositing glass fibers in a desired arrangement for manufacture of the insulation product, applying an organic heat-hardenable organic binder selected from the group consisting of phenol-aldehyde, phenol-amino-aldehyde, and amino-aldehyde resins thereto, heating the glass fibers and associated organic binder in order to cure said binder, saturating the resultant mass with from 30 percent to 200 percent, based upon the weight of the glass fibers, of an inorganic binder-saturant consisting essentially of boric acid and bentonite and heating the saturated mass in order to bring about a reaction between the components of the inorganic binder-saturant and the constituents of the glass fiber, whereby a ceramic-like coating is formed on and about said glass fibers.

References Cited
UNITED STATES PATENTS

| | | | |
|---|---|---|---|
| 3,002,857 | 10/1961 | Stalego | 117—126 |
| 3,271,323 | 9/1966 | Whittemore | 252—432 |
| 2,500,665 | 3/1950 | Courtright | 117—46 CA |

MARION E. McCAMISH, Primary Examiner

U.S. Cl. X.R.

117—126; 161—170, 198